(12) United States Patent
Kim (10) Patent No.: US 10,859,703 B2
(45) Date of Patent: Dec. 8, 2020

(54) ROTARY DISTANCE MEASURING APPARATUS

(71) Applicant: HITACHI-LG DATA STORAGE KOREA, INC., Seoul (KR)

(72) Inventor: Taesung Kim, Seoul (KR)

(73) Assignee: HITACHI-LG DATA STORAGE KOREA, INC., Seoul (KR)

(*) Notice: Subject to any disclaimer, the term of this patent is extended or adjusted under 35 U.S.C. 154(b) by 353 days.

(21) Appl. No.: 15/921,130

(22) Filed: Mar. 14, 2018

(65) Prior Publication Data
US 2018/0267168 A1    Sep. 20, 2018

(30) Foreign Application Priority Data
Mar. 16, 2017  (KR) .................. 10-2017-0033115

(51) Int. Cl.
| | | |
|---|---|---|
| *G01S 17/00* | (2020.01) | |
| *G01S 17/87* | (2020.01) | |
| *H02K 11/22* | (2016.01) | |
| *G01S 7/481* | (2006.01) | |
| *G01C 3/08* | (2006.01) | |
| *G01S 17/10* | (2020.01) | |
| *H02K 11/042* | (2016.01) | |
| *H02K 7/14* | (2006.01) | |
| *G01S 7/4863* | (2020.01) | |
| *H02K 21/22* | (2006.01) | |

(52) U.S. Cl.
CPC .............. *G01S 17/87* (2013.01); *G01C 3/08* (2013.01); *G01S 7/481* (2013.01); *G01S 7/4813* (2013.01); *G01S 7/4863* (2013.01); *G01S 17/10* (2013.01); *H02K 7/14* (2013.01); *H02K 11/042* (2013.01); *H02K 11/22* (2016.01); *H02K 21/22* (2013.01)

(58) Field of Classification Search
USPC ................................................. 356/3.01, 3.02
See application file for complete search history.

(56) References Cited

U.S. PATENT DOCUMENTS

| | | | | |
|---|---|---|---|---|
| 5,250,777 A | * | 10/1993 | Fishman | F27B 14/061 219/619 |
| 5,637,973 A | * | 6/1997 | Hirai | B23Q 1/00 318/640 |
| 6,288,475 B1 | * | 9/2001 | Ito | H02N 2/147 310/323.01 |

(Continued)

*Primary Examiner* — James R Hulka
(74) *Attorney, Agent, or Firm* — Birch, Stewart, Kolasch & Birch, LLP (57) ABSTRACT

The distance measuring apparatus according to the present invention may comprise: a distance measuring unit; a motor; and a rotary wireless transceiver, comprising a rotor core rotated by the motor, a stator core, and power coils and signal coils respectively wound around the rotor core and the stator core, configured to wirelessly supply power to the power coil wound around the rotor core via the power coil wound around the stator core and wirelessly transmit the signal output from the distance measuring unit to the signal coil wound around the stator core via the signal coil wound around the rotor coil. The rotor core and the stator core may be in a shape of a circular plain such that the rotor core and the stator core face each other with a plane, perpendicular to a rotation axis of the motor, interposed between them.

7 Claims, 7 Drawing Sheets

(56) References Cited

U.S. PATENT DOCUMENTS

| | | | | |
|---|---|---|---|---|
| 6,504,600 B2* | 1/2003 | Kawaguchi | ............... | G01C 3/08 |
| | | | | 180/169 |
| 8,130,368 B2* | 3/2012 | Eno | ....................... | G01S 7/4813 |
| | | | | 356/3.01 |
| 8,144,311 B2* | 3/2012 | Eno | ....................... | G01B 11/026 |
| | | | | 356/3.01 |
| 2008/0176686 A1* | 7/2008 | Isogai | ........................ | F16D 3/22 |
| | | | | 474/11 |
| 2012/0262693 A1* | 10/2012 | Mertz | .................... | G01S 7/4813 |
| | | | | 356/3.01 |
| 2015/0015104 A1* | 1/2015 | Kataoka | ................. | H02K 1/165 |
| | | | | 310/80 |
| 2015/0171702 A1* | 6/2015 | Matsuda | ................ | F16D 23/14 |
| | | | | 310/68 B |

* cited by examiner

ROTARY DISTANCE MEASURING APPARATUS

This application claims the benefit of priority under 35 U.S.C. § 119(a) to Korean Patent Application No. 10-2017-0033115 filed on Mar. 16, 2017, which is incorporated by reference herein in its entirety.

BACKGROUND

Field

The present invention relates to a rotary distance measuring apparatus, and more particularly, to a structure of a distance measuring apparatus for measuring a distance while rotating.

Related Art

Due to an increase in the elderly population, a well-being fad, and hard work avoidance, the demand for housework assistant robots such as robot cleaners has increased and the service robot market has been growing. A service robot based on autonomous driving recognizes an indoor configuration environment, creates an indoor terrain map, detects obstacles, and moves according to autonomous determination. Therefore, various sensors including a distance measuring sensor for distance measurement are employed in the service robot.

Examples of the sensor for measuring a distance include an infrared sensor using infrared rays, an ultrasonic sensor using ultrasonic waves, and a TOF sensor. The infrared sensor can measure a distance to a target object by using a PSD (Position Sensitive Detector) that emits a infrared light via a light source, receives the incoming light reflected from the surface of the target object and calculates a light receiving point by an output current according to a triangulation principle. The TOF sensor comprises a light source such as an LED emitting a very short infrared pulse and a light receiving sensor for detecting reflected light reflected from an object and calculates the distance to the object by measuring the interval from the time when a light is emitted from the light source to the time when the light reflected from the object is returned to the light receiving sensor.

Figure 1:
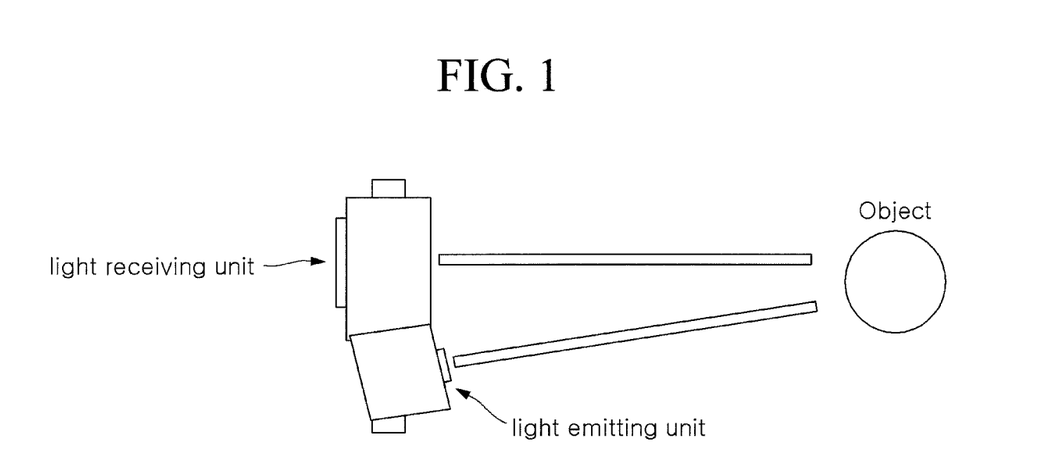
FIG. 1 is a top view of a distance measuring apparatus for measuring distances.

FIG. 1 is a top view of a distance measuring apparatus for measuring distances, and is directed to the infrared sensor using triangulation principle or the TOF sensor using triangulation.

The distance measuring apparatus may include a light emitting unit for emitting an infrared ray or an infrared pulse, and a light receiving unit for detecting the light which is emitted by the light emitting unit and then reflected by a target object.

The light emitting unit may include a light source such as a laser diode for generating an infrared ray outside the visible light beam and a collimator lens for outputting the ray as parallel light. The light receiving unit may include a light receiving lens for outputting an incident light in a predetermined size and shape, a band pass filter for receiving the wavelength band of the laser beam emitted from the light emitting source, and a detector for detecting the incident light and outputting it as an electric signal. In the triangulation method the position at which the reflected and incident light is formed varies depending on the distance, so the detector of the distance measuring apparatus using the triangulation method can measure the distance to an object by using the position of the incident light.

Meanwhile, since the service robot assumes movement, if the mounted distance measuring device measures the distance only in a fixed direction, a large number of distance measuring devices are required to measure the distances in various directions. Taking this into consideration, a distance measuring device for measuring a distance in 360 degrees or a predetermined angle range while rotating is being developed.

Figure 2:
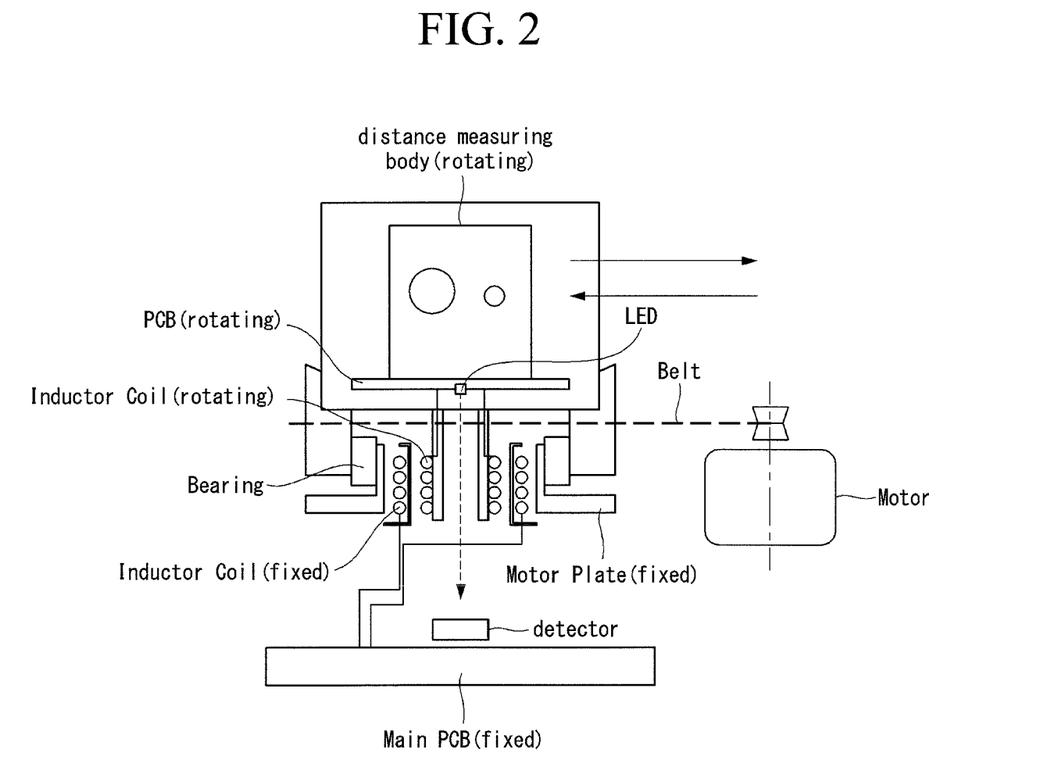
FIG. 2 shows a structure of a conventional rotary distance measuring apparatus for measuring a distance while rotating FIG. 3 schematically shows a structure of a rotary distance measuring apparatus according to the present invention.

FIG. 2 shows a structure of a conventional rotary distance measuring apparatus for measuring a distance while rotating.

In the rotary distance measuring apparatus shown in FIG. 2, the distance detecting body of FIG. 1 including the light emitting unit and the light receiving unit emits a laser beam and obtains a signal by the incident light reflected on an object and formed on the detector while rotating by a motor. And the distance detecting body transmits the signal to a main PCB, which is fixed without rotation, to calculate a distance based on the signal.

The distance detecting body receives the rotary force of the motor mounted on the outside through a belt. A bearing is provided between a rotary body and a motor plate to reduce rolling friction and supports the rotary body on the fixed motor plate so that the rotary body stably rotates in a constant orbit.

A pair of inductor coils (rotary inductor coil and fixed inductor coil) wound in a cylindrical shape are arranged at the center of the apparatus so that power can be applied to the rotary body from a main PCB wirelessly. The rotary PCB constructed on the rotary body converts the signal related to the distance obtained by the distance detecting body into light through the LED and transmits it to the main PCB through the passage provided at the center of the apparatus. The main PCB may detect the light via a detector and obtain distance information.

However, since a signal is transmitted from the rotary body to the fixed PCB through the LED and the detector, the structure of the apparatus is complicated and there is a structural restriction to provide the passage at the center of the apparatus. That is, according to this restriction, the motor cannot directly drive the rotary body, but must drive the rotary body indirectly through the belt, and the rotary body must be supported on the fixed plate through the bearing.

Further, since the belt connected to the motor drives the body to rotate, noise is generated due to the rotation of the belt, and the life of the product is limited due to the durability of the belt or bearing.

SUMMARY

Accordingly, the present invention has been made in view of such circumstances, and it is an object of the present invention to simplify the rotary distance measuring apparatus. A rotary distance measuring apparatus according to an embodiment of the present invention may comprise: a distance measuring unit for emitting light and outputting a signal corresponding to reflected light which is reflected on and returned from an object; a motor for rotating the distance measuring unit; and a rotary wireless transceiver, comprising a rotor core rotated by the motor, a stator core which does not rotate and is fixed, and power coils and signal coils which are respectively wound around the rotor core and the stator core, configured to wirelessly supply power to the power coil wound around the rotor core via the power coil wound around the stator core and wirelessly transmit a signal output from the distance measuring unit to the signal coil wound around the stator core via the signal coil wound around the rotor core, wherein the rotor core and the stator core are in a shape of a circular plate such that the rotor core and the stator core face each other with a plane, perpendicular to a rotation axis of the motor, interposed between the rotor core and the stator core.

In an embodiment, the apparatus may further comprise a cap for covering the distance measuring unit.

In an embodiment, the cap may comprise a transparent window in a first region through which the light emitted from the distance measuring unit which rotates in synchronization with the cap, passes and a second region through which the reflected light is incident on the distance measuring unit, and a remaining region of the cap may be opaque.

In an embodiment, the apparatus may further comprise a connecting unit for fixing the stator core to the motor.

In an embodiment, the distance measuring unit may comprises: a light emitting unit for emitting light in a pulse shape with a predetermined width; and a light receiving unit, comprising a plurality of cells arranged in one direction, configured to receive the reflected light which is emitted from the light emitting unit, reflected on an object and returned and output a signal corresponding to an amount of the received light.

In an embodiment, two grooves comprising a first groove and a second groove may be formed in a ring shape on an inner surface of each of the rotor core and the stator core, the inner surface of the rotor core facing the inner surface of the stator core, a radius of a ring of the first groove being different from that of a ring of the second groove, and the power coil may be wound around the first groove and the signal coil is wound around the second groove.

In an embodiment, the rotary wireless transceiver may further comprise: an oscillator for generating an alternating signal; a power amplifier for amplifying the alternating signal generated by the oscillator to a high power and outputting the amplified alternating signal to the power coil wound around the rotor core; a rectifier for rectifying an alternating current flowing through the power coil wound around the rotor core into a direct current; and a regulator for generating a voltage using the direct current output from the rectifier.

In an embodiment, the rotary wireless transceiver may further comprise: a modulator for modulating a signal output from the distance measuring unit into a signal for wireless transmission; a transmitting signal amplifier for amplifying the signal output from the modulator and outputting the amplified signal to the signal coil wound around the rotor core; a receiving signal amplifier for amplifying a current flowing through the signal coil wound around the stator core; and a demodulator for demodulating a signal output from the receiving signal amplifier.

In an embodiment, a power wiring for extending and connecting the power coil wound around the rotor core to the distance measuring unit and a signal wiring for extending and connecting the signal coil wound around the rotor core to the distance measuring unit may be drawn from opposite directions with respect to the rotation axis of the motor.

Accordingly, it is possible to simplify the structure of the distance measuring device composing a rotary part and a fixed part by adopting the structure in which electric power and signals can be transmitted separately and wirelessly by an inductor coil structure. In addition, a rotary body is directly driven by a motor, so that no bearing or belt is used, which improves durability, prolongs the life of the apparatus, and reduces cost.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of a rotary distance measuring apparatus according to the present invention will be described in detail with reference to the accompanying drawings.

In a distance measuring apparatus, a light source emits light, and a light receiving sensor outputs a signal proportional to the amount of incident light reflected from an object. In order for the distance measuring apparatus to operate while rotating, power must be transmitted from a main PCB which does not rotate and is fixed to the light source and the light receiving sensor which rotate, and the output signal of the light receiving sensor must be transmitted to the main PCB.

In the present invention, in order to simplify the structure of the rotary distance measuring apparatus, a body equipped with a distance measuring device can be directly driven to rotate using a motor, and a rotary transformer (rotary wireless transceiver) can be used to transmit power and signals wirelessly between a rotary body and a fixed body in a non-contact manner.

The rotary transformer for wirelessly supplying a signal and power in a non-contact manner is provided, and a power coil for power supply and a signal coil for signal transmission are separately wound on a rotor and a stator in the form of a circular plate, which enable power to be transmitted from the fixed body to the rotary body and a signal to be transmitted from the rotary body to the fixed body.

Figure 3:
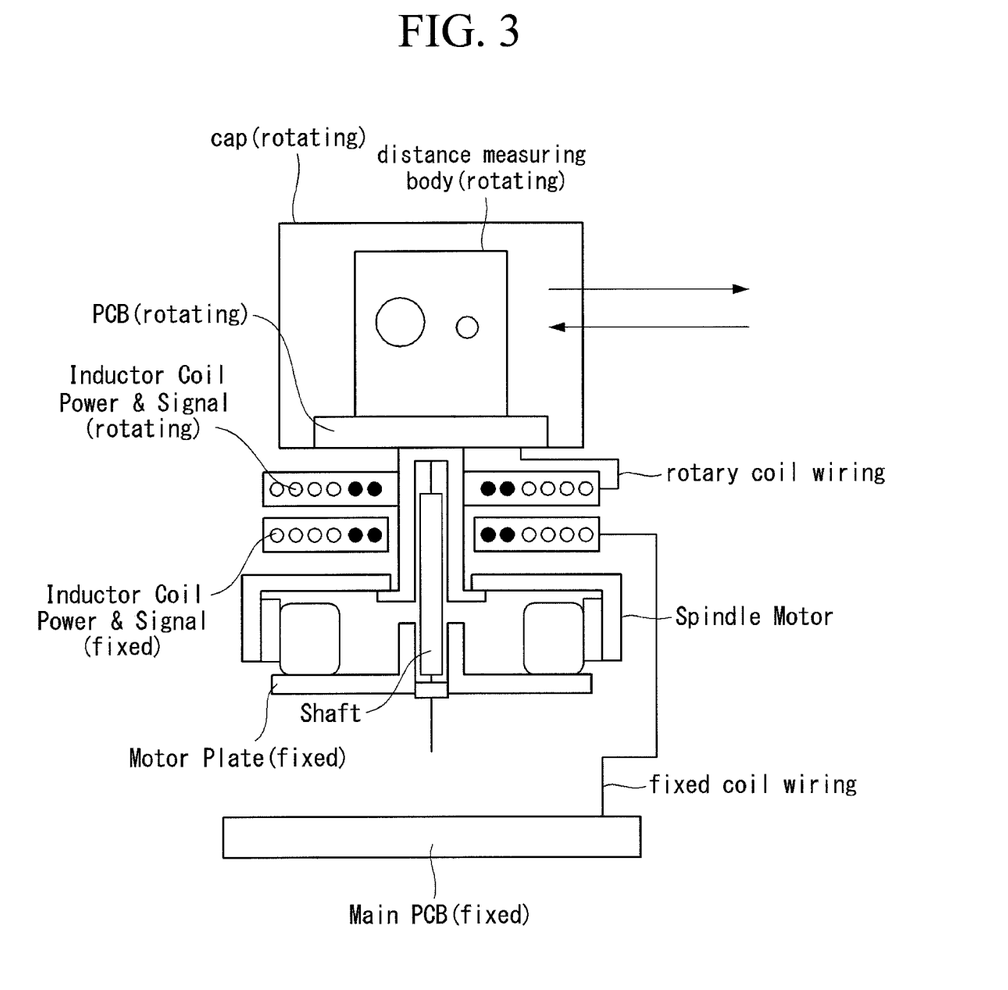
Figure 4:
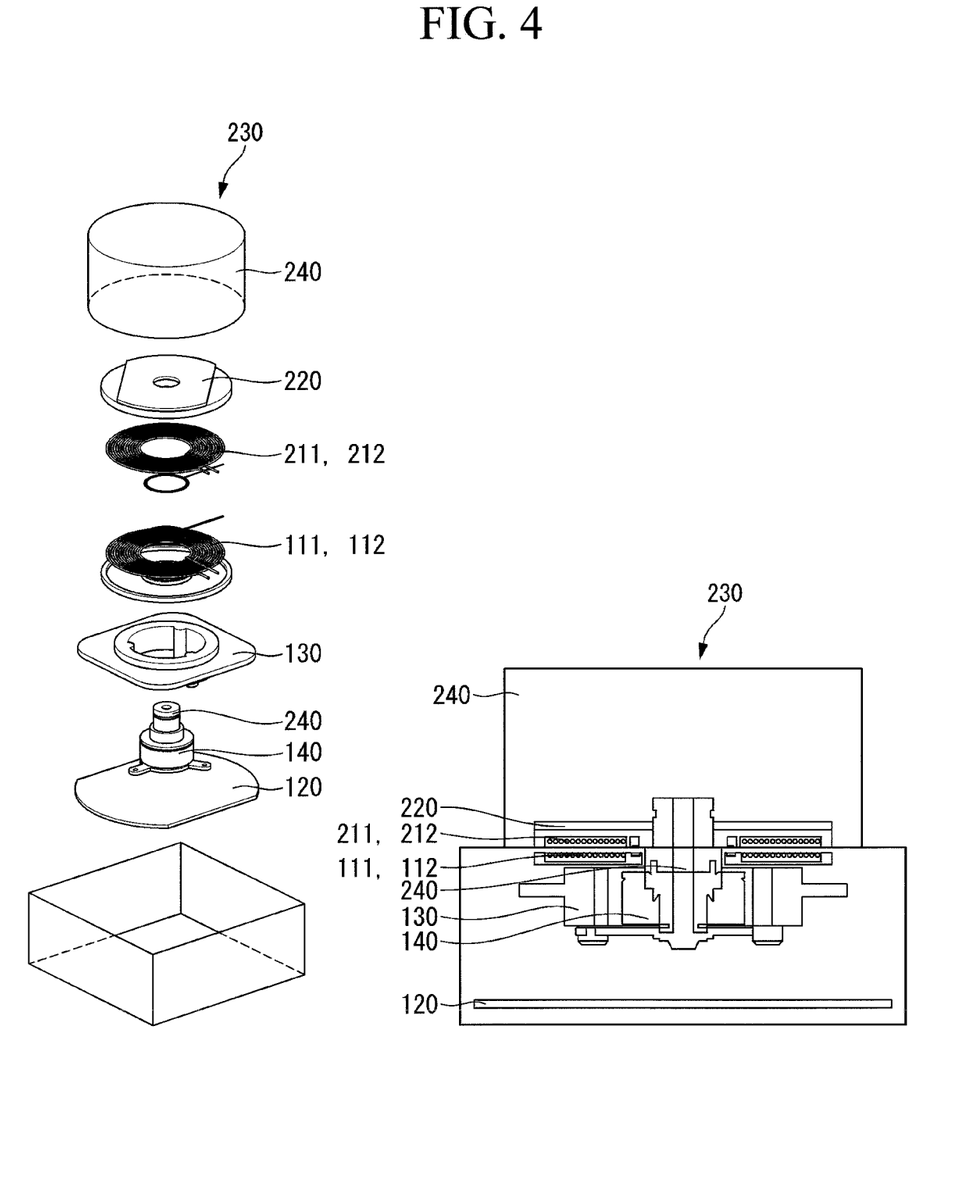
FIG. 4 shows an exploded perspective view and a cross-sectional view of a rotary distance measuring apparatus according to the present invention.

FIG. 3 schematically shows a structure of a rotary distance measuring apparatus according to the present invention, and FIG. 4 shows an exploded perspective view and a cross-sectional view of a rotary distance measuring apparatus according to the present invention.

The rotary body rotating while being connected to the shaft of a motor may comprise a distance measuring unit 230, a cap or a cover 240 for covering and protecting the distance measuring unit 230, a rotary PCB (Printed Circuit Board) 220 for supplying power to the distance measuring unit 230 and repeating the signal output from the distance measuring unit 230, and a rotor (including a rotor core and power/signal coils 211/212) of a rotary transformer for transmitting and receiving power and a signal to and from the fixed body wirelessly The fixed body may comprise a main PCB 120 for controlling the driving of the distance measuring apparatus, a motor 120, a stator (including a stator core and power/signal coils 111/112) of the rotary transformer for supplying power to the rotary body and receiving a signal related to distance from the rotary body and a connecting unit 130 for fixing the stator of the rotary transformer to the motor 140 or the main PCB 120.

The rotary transformer includes the stator core connected to the fixed body and the rotor core connected to the rotary body. The rotor core is connected to the shaft 240 of the motor 140 and rotates about the shaft as a rotation axis. The stator core is fixed while being connected to a motor plate (corresponding to the connecting unit 130).

The stator core and the rotor core are in the form of a circular plate (disk) having a shaft 240 as a rotation axis and arranged to face each other while being separated at a predetermined interval with respect to a direction in which the rotation axis extends. Two or more ring-shaped grooves are formed on the inner surfaces of the stator core and the rotor core, respectively, about the rotation axis. Power coils 111 and 211 for power supply may be wound on one of the grooves, and signal coils 112 and 212 for signal transmission may be wound on the other of the grooves.

Power can be supplied from the fixed body to the rotary body through the power coils 111 and 211 facing each other in an inductive coupling manner based on a magnetic induction phenomenon. Likewise, through the signal coils 112 and 212 facing each other, the signal related to a distance output from the distance measuring apparatus can be supplied from the rotary body to the fixed body.

The power transmitting coil 111 and the signal receiving coil 112 wound around the stator core are connected to the main PCB 120 through fixed coil wirings, and the power receiving coil 211 and the signal transmitting coil 212 wound around the rotor core are connected to the rotary PCB 220 through rotary coil wirings.

The cap 250 protects the distance measuring unit 230 from external impact or dust while being mounted on the top of the rotary PCB 220 and the distance measuring unit 230 and rotating together with the distance measuring unit 230 in a synchronized manner. In the cap 250, a well-penetrating window is formed in a region through which the light emitted from the distance measuring unit 230 passes and a region through which the light reflected on an object is incident on the distance measuring unit 230, and a remaining region can be formed to be opaque so as not to introduce unnecessary light.

Or, the cap 250 can protect the distance measuring unit 230, the rotary PCB 220 and the rotary transformer from external impact or dust while being fixed and not rotating. In this case, only a predetermined range of regions (a 360-degree strip region of a predetermined height) through which the light emitted from the distance measuring unit 230 passes and the light reflected on an object is incident on the distance measuring unit 230 can form a transparent window.

Figure 5:
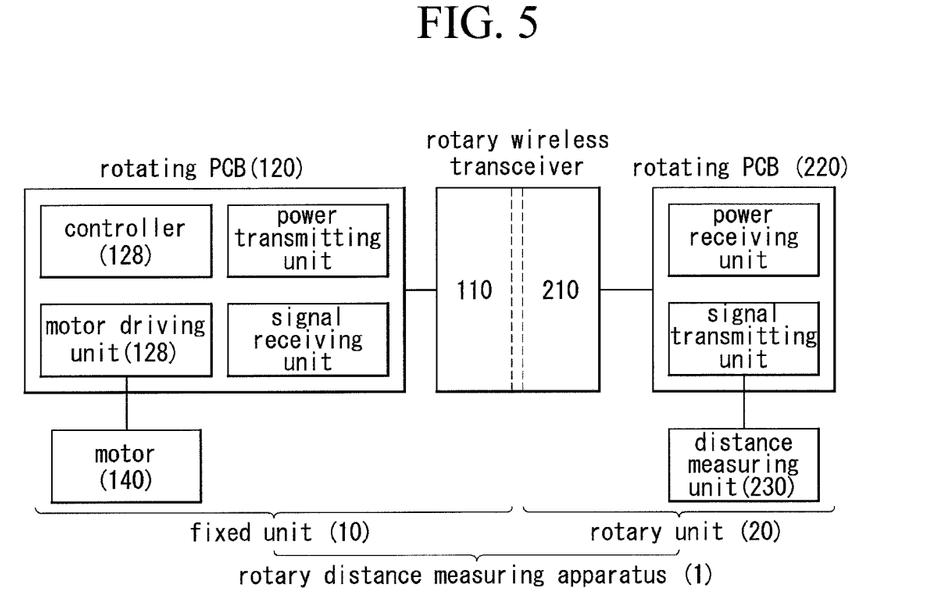
FIG. 5 is a block diagram showing the configuration of the rotary distance measuring apparatus according to the present invention in units of functional blocks.

FIG. 5 is a block diagram showing the configuration of the rotary distance measuring apparatus according to the present invention in units of functional blocks.

The rotary distance measuring apparatus 1 comprises a fixed unit 10 which does not rotate and a rotary unit 20 which rotates.

The rotary unit 10 comprises the stator core 110 of the rotary transformer (or rotary wireless transceiver), the main PCB 120 and the motor 140, so rotates the rotary unit 20, supplies power to the rotary unit 20, and measures distance based on the signal sent from the rotary unit 20.

The main PCB 120 may comprise a motor driving unit 127 for controlling the driving of the motor, a power transmitting unit for supplying power to the rotary unit 20 via the rotary transformer, a signal receiving unit for receiving the signal sent from the rotary unit 20 via the rotary transformer, and a controller 128 for controlling the overall operations of the rotary distance measuring apparatus 1.

The rotary unit 20 may comprise the rotary PCB 220 and a distance measuring unit 230 for emitting light, receiving the light reflected on an object and outputting the signal corresponding to the distance to the object.

The rotary PCB 220 may comprise a power receiving unit for receiving power from the rotary unit 10 via the rotary transformer and a signal transmitting unit for transmitting a distance-related signal output from the distance measuring unit 230 to the fixed unit 10 via the rotary transformer.

The controller 128 may control the motor driving unit 127 to rotate the shaft 240 of the motor 140, control the power transmitting unit to supply power to the rotary unit 20 in a non-contacting manner, control the signal receiving unit to receive the distance-related signal from the rotary unit 20 in the non-contacting manner, and calculate and output distance based on the received signal.

Figure 6:
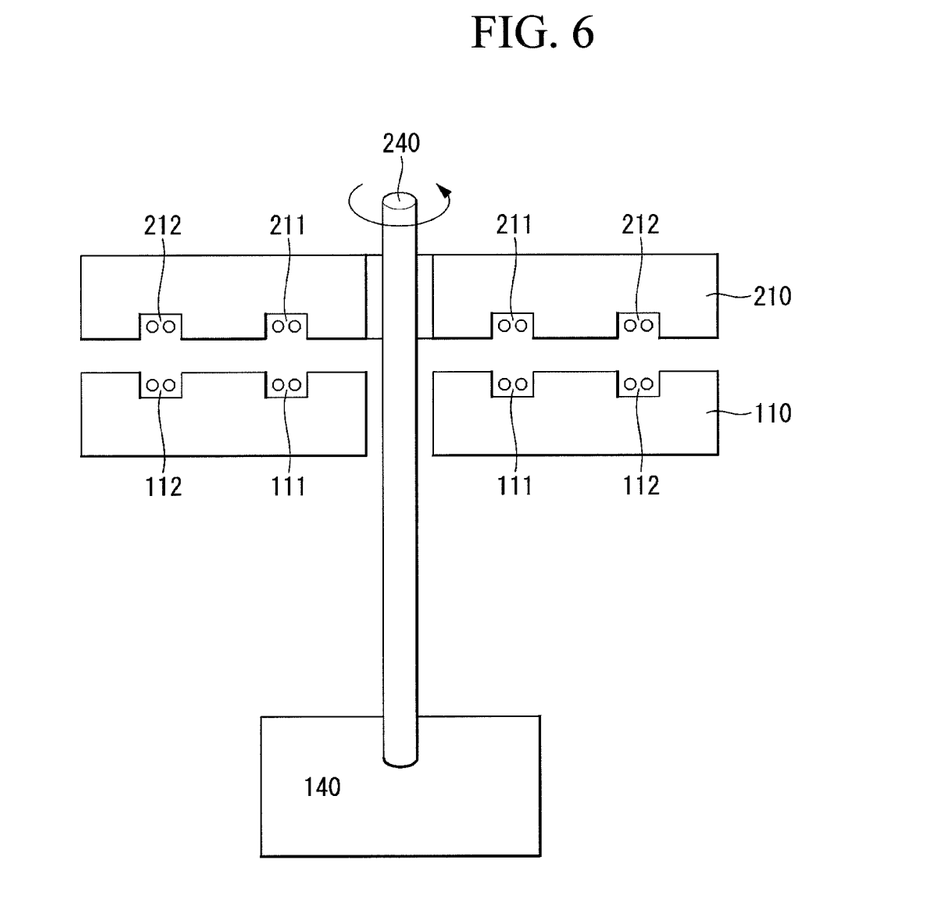
FIG. 6 illustrates a physical configuration of a rotary wireless transceiver for transmitting and receiving power and signals with a rotary body.

FIG. 6 illustrates a physical configuration of a rotary wireless transceiver for transmitting and receiving power and signals with a rotary body.

The rotary transformer or the rotary wireless transceiver is a device for supplying power from the fixed unit 10 of a fixed body to the rotary unit 20 of a rotating body and transmitting a distance-related signal from the rotary unit 20 to the fixed unit 10. Coils are arranged to face each other for a inductive coupling necessary to transmit power and signals.

Since the rotary unit 20 rotates about the shaft 240 as a center axis, the coils must be wound in a ring shape symmetrical about the shaft 240 in order to transmit and receive power and signals between the fixed unit 10 and the rotary unit 20. And, two coils to be inductively coupled, that is a transmitting coil and a receiving coil are arranged to face each other with a small gap.

And, in order to separately transmit power and signals, a power coil and a signal coil must be arranged so as not to overlap each other.

In the present invention, as shown in FIG. 6, the cores around which coils are to be wound in a ring shape have the shape of a circular plate (or disk), and the circular plates of two cores face each other with respect to a direction in which the shaft 240 extends. An, the diameter of the ring of the power coil for power supply is different from the diameter of the ring of the signal coil for signal transmission so that the power coil and the signal coil do not interfere with each other.

In FIG. 6, the rotary transformer comprises the stator core 110 which does not rotate and the rotor core 210 connected to the shaft 240 to rotate.

Two grooves of a ring shape (the ring shape is seen from a direction in which the shaft 240 extends) having different radii are formed on the inner surface of the stator core 110 of the disk shape, that is on the surface (the upper surface in FIG. 6) facing the rotor core 210. The power transmitting coil 111 for power supply is wound on one of the two grooves, and the signal receiving coil 112 for signal reception is wound on the other of the two grooves.

In FIG. 6, it is shown that the power transmitting coil 111 is wound on the groove closer to the rotation axis and the signal receiving coil 112 is wound on the groove farther from the rotation axis. Contrary, the power transmitting coil 111 may be wound on the groove farther from the rotation axis and the signal receiving coil 112 may be wound on the groove closer to the rotation axis.

Three or more grooves may be formed on the inner surface of the stator core 110, and the power transmitting coil 111 and the signal receiving coil 112 may be wound on the grooves which are not adjacent to each other, which make it possible to prevent the magnetic fields generated when transmitting and receiving power and signals from affecting each other.

The stator core 110 may be connected to the connecting unit 130 shown in FIG. 4 to be fixed to the motor 140 or the main PCB 120.

Two grooves of a ring shape having different radii are formed on the inner surface of the rotor core 210, that is on the surface (the lower surface in FIG. 6) facing the stator core 110. The power receiving coil 211 for power reception is wound on one of the two grooves, and the signal transmitting coil 212 for signal transmission is wound on the other of the two grooves.

The grooves on the rotor core 210 and the grooves on the stator core 110 must be formed at positions of same radii from the rotation axis. The power transmitting coil 111 and the power receiving coil 211 must be wound on corresponding grooves and the signal receiving coil 112 and the signal transmitting coil 212 must be wound on corresponding grooves.

In the present invention, as shown in FIG. 6, the power coils for power supply and the signal coils for signal transmission are wound in a ring shape at different radii around the shaft 240, that is the rotation axis. And, corresponding two coils (the power transmitting coil and the power receiving coil, and the signal transmitting coil and the signal receiving coil) are arranged to face each other with respect to a direction in which the rotation axis extends. For the arrangement, the cores around which the coils are to be wound can be formed in a circular plate having a low height in a direction in which the rotation axis extends. Accordingly, the height of the apparatus can be reduced and the apparatus can be configured compactly.

Furthermore, since the poser coils and the signal coils are wound in different radii, the connecting wirings (power wiring and signal wiring) for respectively connecting the power receiving coil 211 and the signal transmitting coil 212 of the rotor core 210 to the rotary PCB 220 must be drawn from different radii and drawn in opposite directions with respect to the rotation axis, which can prevent signal interferences from occurring between the connecting wirings and among the connecting wiring and the coils.

On the other hand, when changing the configuration in which corresponding two coils face each other in a radial direction from the rotation axis as shown in FIG. 2 of the conventional art, it is conceivable to wind power coils for power supply and signal coil for signal transmission at different heights in the direction in which the rotation center axis extends, in order to transmit both of power and signals wirelessly.

However, in the conceived configuration, the height of the apparatus is increased. And, when the connecting wiring extended from the coil wound at a lower height passes around the coil wound at a higher height in order to connect the connecting wiring to a rotary body, the connecting wiring must pass through a narrow gap (because corresponding two coils must be closely arranged with the narrow gap between them for higher inductive coupling). So, there is a high possibility of signal interference between the connection wiring and the coils.

Furthermore, among corresponding two coils, the inner coil can be wound outside a pipe-shaped core, but the outer coil cannot be wound inside another pipe-shaped pipe. So, the outer coil is also forced to be wound outside the pipe-shaped core having a larger diameter. So, it is difficult to narrow the gap between the corresponding two coils, thereby deteriorating inductive coupling efficiency.

However, in the present invention, as shown in FIG. 6, the cores of a circular plate are arranged in parallel to face each other at a narrow interval with respect to the direction in which the rotation axis extends, two grooves of a ring shape are formed at different radii about the rotation axis, and the power coil and the signal coil are wound on the two grooves. So, it is possible to increase inductive coupling efficiency by reducing the gap between the corresponding two coils while transmitting power and signals without interfering with each other.

Figure 7:
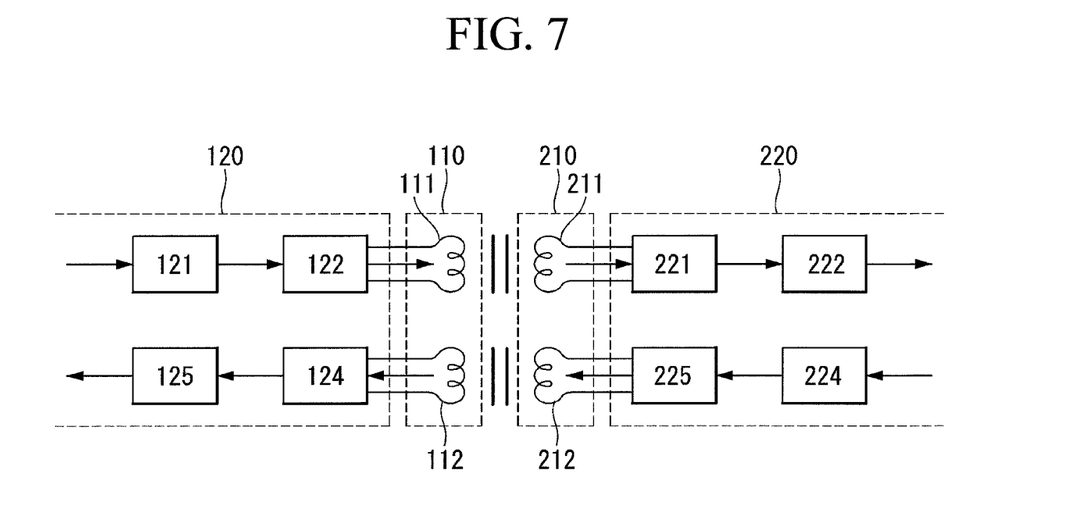
FIG. 7 shows a rotary wireless transceiver and related peripheral elements in functional block units, FIG. 8 schematically shows a configuration of an apparatus for measuring distances in a triangulation method and a TOF method using a light receiving sensor having a plurality of cells.

FIG. 7 shows a rotary wireless transceiver and related peripheral elements in functional block units.

The power transmitting unit embedded in the stator core 110 and the main PCB 120 to supply power to the rotary unit 20 may comprise a oscillator 121 for generating an alternating signal for power supply, a power amplifier 122 for amplifying the alternating signal generated by the oscillator 121 to a high-powered alternating current, and the power transmitting coil 111 wound around the stator core 110 to transmit the alternating current output from the power amplifier 122 in a non-contacting manner.

The power receiving unit embedded in the rotor core 210 and the rotary PCB 220 to receive power from the fixed unit 10 may comprise the power receiving coil 211 wound around the rotor core 210 to inductively couple with the power transmitting coil 111, a rectifier 221 for rectifying the alternating current flowing through the power receiving coil 211 into a direct current, and a regulator 222 for generating a voltage necessary for the operations of the rotary PCB 220 and the distance measuring unit 230 using the direct current output from the rectifier 211.

The signal transmitting unit embedded in the rotor core 210 and the rotary PCB 220 to supply a signal to the fixed unit 10 may comprise a modulator 224 for modulating a distance-related signal output from the distance measuring unit 230 into a signal for wireless transmission, a transmitting signal amplifier 225 for amplifying the signal output from the modulator 224, and the signal transmitting coil 212 wound around the rotor core 210 to transmit the signal amplified by the transmitting signal amplifier 225 in a non-contacting manner.

The signal receiving unit embedded in the stator core 110 and the main PCB 120 to receive a distance-related signal from the rotary unit 20 may comprise the signal receiving coil 112 wound around the stator core 110 to inductively couple with the signal transmitting coil 212, a receiving signal amplifier 124 for amplifying a current flowing through the signal receiving coil 112 and a demodulator for demodulating a signal output from the receiving signal amplifier 124.

When the power receiving coil 211 is inductively coupled with the power transmitting coil 111 to output an alternating signal including power and the rectifier 221 and the regulator 222 output a voltage required for operations based on the alternating signal, the distance measuring unit 230 and the rotary PCB 220 can start predetermined operations, that is the operations of emitting light by a light emitting source, outputting a signal corresponding to an incident light by a receiving sensor, and wirelessly transmitting a distance-related signal by the signal transmitting unit.

The rotary wireless transceiver is not limited to comprise the stator core 110, the power transmitting coil 111 and the signal receiving coil 112 wound around the stator core 110, the rotor core 210 and the power receiving coil 211 and the signal transmitting coil 212 wound around the rotor core 210. The rotary wireless transceiver may comprise a power transmitting unit, a power receiving unit, a signal transmitting unit and a signal receiving unit, so it can be said that the rotary wireless transceiver comprises all elements for performing the functions for transmitting power and signals wirelessly.

Meanwhile, the distance measuring unit 230 outputs a distance-related signal reflecting a distance to an object in the range of 360 degrees or a predetermined limited angle range while rotating. The distance measuring unit 230 may measure the distance in a triangulation method or a TOF method.

A distance measuring apparatus for measuring a distance using the TOF method may be problematic in that a cell forming a sensor is saturated when measuring a short distance and may be problematic in that the amount of light is insufficient when measuring a long distance.

In the TOF method, a light emitting unit for emitting light and a light receiving unit for receiving reflected light reflected from an object are required. It is idealistic to align the light emitting unit and the light receiving unit on a same line but it is impossible. If there is a gap between the light emitting unit and the light receiving unit, the position at which a reflected light is formed on a light receiving sensor changes depending on the distance to an object, and the reflected light may escape from the effective cells in the light receiving sensor.

In a distance measuring apparatus using a conventional TOC method, since the light emitting unit and the light receiving unit cannot be arranged on a same line and are separated from each other by a predetermined interval, the position at which a reflected light is formed on a light receiving sensor changes depending on the distance to an object. Taking this into consideration, in order to cause all of the light, reflected from objects within the distance range to be measured, to converge on a light receiving sensor, the light receiving sensor of a linear array type comprising a plurality of cells arranged in one direction can be used.

There is an attempt to solve the cell saturation problem in a short distance and the insufficient light problem in a long distance when using the TOF method, by adopting the light receiving sensor comprising a plurality of cells aligned in one direction and adopting the triangulation method which calculates a distance to an object using the positions of cells on which a reflected light converges.

Figure 8:
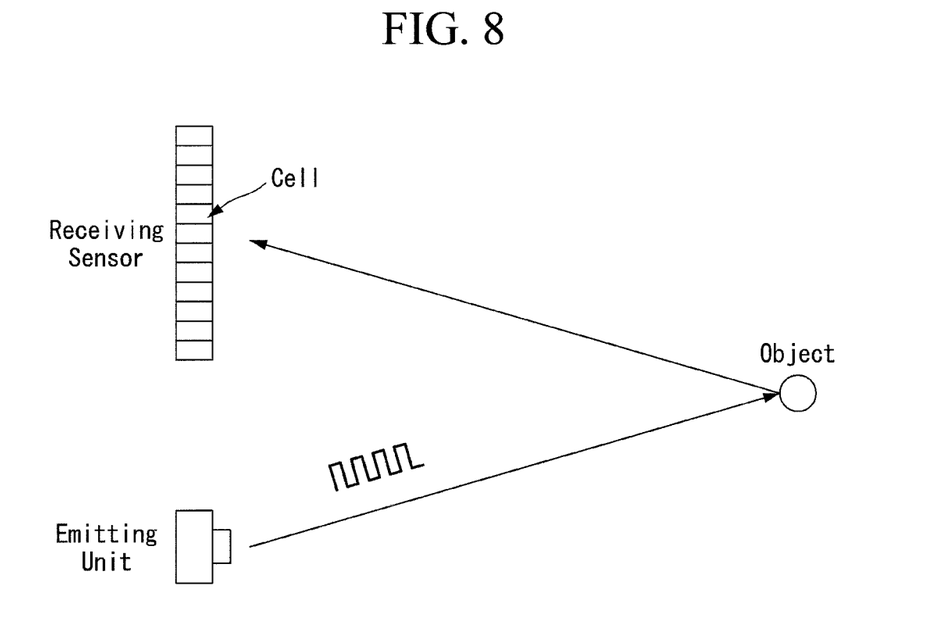

As shown in FIG. 8, the distance measuring apparatus of the TOF method using the light receiving sensor comprising a plurality of cells may comprise the light emitting unit for emitting an infrared pulse with a specific width in order to measure a distance to an object, and the light receiving unit for detecting the reflected light of the infrared light that is radiated by the light emitting unit and then reflected by an object.

Figure 9:
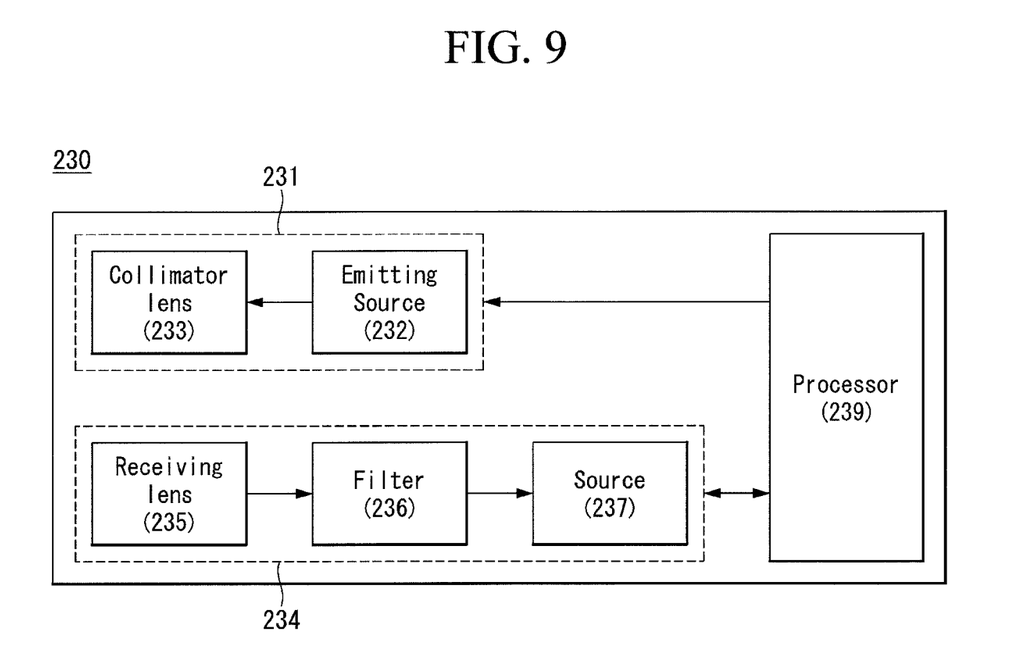
FIG. 9 shows a configuration of a distance detecting unit in units of functional blocks.

FIG. 9 shows a configuration of a distance detecting unit in units of functional blocks The distance measuring unit 230 adopted by the rotary distance measuring apparatus according to the present invention, may comprise a light emitting unit 231 for emitting an infrared pulse with a specific width, a light receiving unit 234 for detecting the reflected light of the infrared light that is radiated by the light emitting unit 231 and then reflected by an object, and a processor 239 for calculating the distance to the object based on the output signal of the light receiving unit 234 using the triangulation method and/or the TOF method.

The light-emitting unit 231 may comprise a light-emitting source 232 comprising a light-emitting module, such as an LED for radiating an infrared light and a driving unit for driving the light-emitting module so that it emits light in a pulse shape with a predetermined width, and an optical system for controlling an angle and/or an intensity of light to be radiated in the front surface of the light-emitting source 232, for example, a collimator lens 233.

The light-receiving unit 234 may comprise a light-receiving lens 235 for converting an incident light in a specific size and shape, such as a telecentric lens, a filter 236 for selectively transmitting only a wavelength band of the light emitted by the light emitting source 232, and a light receiving sensor 237 comprising a plurality of cells aligned in one direction in order to detect the reflected light.

In order to measure a distance using the TOF method, each of the cells of the light receiving sensor 237 may receive a reflected light in synchronization with an infrared pulse emitted by the light emitting source 232 (phase 1), receive a reflected light with a phase difference of 180 degrees from the infrared pulse emitted by the light-emitting source 232 (phase 2), and output an electrical signal V1 for the phase 1 and an electrical signal V2 for the phase 2.

The processor 239 may calculate a distance to an object from which the emitted light is reflected by using the electrical signals output from the cells of the light-receiving sensor 237. The processor 239 may identify a cell at which a center point of the converged light is placed using a distribution of the cells (i.e., the intensities of the electrical signals and the section of the cells generating the electrical signals) or a cell at which a maximum value of the electrical signals is placed, and calculate a distance using the electrical signals output from the identified cell or the electrical signals output from the surrounding cells including the identified cell using in the TOF method. Or, the processor 239 may calculate a distance to an object based on the positions of cells at which the incident light converges in accordance with the triangulation method. Or the processor 239 may calculate the distance using the triangulation method and the TOF method in an associated manner.

That is, the processor 239 may calculate a distance to an object by calculating the time that is taken for the emitted light to be converged on the light receiving sensor 237 as the reflected light, based on the electrical signal V1 of the phase 1 and the electrical signal V2 of the phase 2 generated by the cells of the light receiving sensor 237, in accordance with the TOF method.

Although it has been described that the processor 239 included in the distance measuring unit 230 calculates a distance using the signals output from the light receiving sensor 237 in the above paragraphs, the processor 239 may perform only the operations required to wirelessly transmit the signal output from the light receiving sensor 237 to the main PCB 120 without calculating a distance. That is, the processor 239 may perform the function of the modulator 224 included in the signal transmitting unit. At this time, the controller 128 included in the main PCB 120 can calculate a distance using the signals received through the signal receiving unit.

As shown and described above, the distance measuring unit does not use a belt or a bearing and rotates by adopting a simple structure in which the distance measuring unit is directly connected to the shaft of a motor. And, while rotating, the distance measuring unit may receive power from the fixed unit which does not rotate and transmit a distance-related signal to the fixed unit in a non-contacting manner, by using the rotary transformer comprising two disk-shaped cores, facing each other in a condition that one rotates and the other is fixed with a plane perpendicular to the rotation axis of the shaft interposed between them, and the coils wound on two ring-shaped grooves formed on respective cores and having different radii.

As described above, the embodiments of the present invention have been disclosed for illustrative purposes, and those skilled in the art may improve, change, replace, or add various other embodiments without departing from the technical spirit and scope of the present invention disclosed in the attached claims.

What is claimed is:

1. A rotary distance measuring apparatus, comprising:
   a distance measuring unit for emitting light and outputting a signal corresponding to reflected light which is reflected on and returned from an object;
   a motor for rotating the distance measuring unit; and
   a rotary wireless transceiver, comprising a rotor core rotated by the motor, a stator core which does not rotate and is fixed, and power coils and signal coils which are respectively wound around the rotor core and the stator core, configured to wirelessly supply power to the power coil wound around the rotor core via the power coil wound around the stator core and wirelessly transmit a signal output from the distance measuring unit to the signal coil wound around the stator core via the signal coil wound around the rotor core,
   wherein the rotor core and the stator core are in a shape of a circular plate such that the rotor core and the stator core face each other with a plane, perpendicular to a rotation axis of the motor, interposed between the rotor core and the stator core,
   wherein two grooves comprising a first groove and a second groove are formed in a ring shape on an inner surface of each of the rotor core and the stator core, the inner surface of the rotor core facing the inner surface of the stator core and a radius of a ring of the first groove being different from that of a ring of the second groove,
   wherein the power coil is wound around the first groove and the signal coil is wound around the second groove, and
   wherein a power wiring for extending and connecting the power coil wound around the rotor core to the distance measuring unit and a signal wiring for extending and connecting the signal coil wound around the rotor core to the distance measuring unit are drawn from opposite directions with respect to the rotation axis of the motor.

2. The rotary distance measuring apparatus of claim 1, further comprising:
   a cap for covering the distance measuring unit.

3. The rotary distance measuring apparatus of claim 2, wherein the cap comprises a transparent window in a first region through which the light emitted from the distance measuring unit which rotates in synchronization with the cap, passes and a second region through which the reflected light is incident on the distance measuring unit, and a remaining region of the cap is opaque.

4. The rotary distance measuring apparatus of claim 1, further comprising:
   a connecting unit for fixing the stator core to the motor.

5. The rotary distance measuring apparatus of claim 1, wherein the distance measuring unit comprises:
   a light emitting unit for emitting light in a pulse shape with a predetermined width; and
   a light receiving unit, comprising a plurality of cells arranged in one direction, configured to receive the reflected light which is emitted from the light emitting unit, reflected on an object and returned and output a signal corresponding to an amount of the received light.

6. The rotary distance measuring apparatus of claim 1, wherein the rotary wireless transceiver further comprises:
   an oscillator for generating an alternating signal;
   a power amplifier for amplifying the alternating signal generated by the oscillator to a high power and outputting the amplified alternating signal to the power coil wound around the rotor core;
   a rectifier for rectifying an alternating current flowing through the power coil wound around the rotor core into a direct current; and
   a regulator for generating a voltage using the direct current output from the rectifier.

7. The rotary distance measuring apparatus of claim 6, wherein the rotary wireless transceiver further comprises:
   a modulator for modulating a signal output from the distance measuring unit into a signal for wireless transmission;
   a transmitting signal amplifier for amplifying the signal output from the modulator and outputting the amplified signal to the signal coil wound around the rotor core;
   a receiving signal amplifier for amplifying a current flowing through the signal coil wound around the stator core; and
   a demodulator for demodulating a signal output from the receiving signal amplifier.

\* \* \* \* \*